United States Patent
Orman et al.

(10) Patent No.: US 10,166,673 B2
(45) Date of Patent: Jan. 1, 2019

(54) PORTABLE APPARATUS FOR CONTROLLING ROBOT AND METHOD THEREOF

(71) Applicant: ABB Schweiz AG, Baden (CH)

(72) Inventors: Maciej Orman, Shanghai (CN); Wanli Jiang, Shanghai (CN); Carlos Martinez, South Windsor, CT (US); Jacek Plesnar, Kraków (PL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/235,719

(22) Filed: Aug. 12, 2016

(65) Prior Publication Data
US 2016/0346921 A1   Dec. 1, 2016

Related U.S. Application Data

(63) Continuation of application No. PCT/CN2014/074822, filed on Apr. 4, 2014.

(51) Int. Cl.
*B25J 9/16* (2006.01)
*G06F 3/01* (2006.01)
(Continued)

(52) U.S. Cl.
CPC ............. *B25J 9/161* (2013.01); *B25J 9/1689* (2013.01); *B25J 13/088* (2013.01); *G06F 3/016* (2013.01);
(Continued)

(58) Field of Classification Search
CPC ........ B25J 9/161; B25J 13/088; B25J 9/1689; G06F 3/016; G06F 3/0346
(Continued)

(56) References Cited

U.S. PATENT DOCUMENTS

| 5,937,143 A * | 8/1999 | Watanabe | B25J 9/1671 |
| | | | 700/264 |
| 6,016,385 A | 1/2000 | Yee et al. | |

(Continued)

FOREIGN PATENT DOCUMENTS

| CN | 1387659 A | 12/2002 |
| CN | 1808359 A | 7/2006 |

(Continued)

OTHER PUBLICATIONS

State Intellectual Property Office of the P.R. China, International Search Report & Written Opinion issued in corresponding Application No. PCT/CN2014/074822, dated Dec. 31, 2014, 9 pp.
(Continued)

*Primary Examiner* — Jaime Figueroa
(74) *Attorney, Agent, or Firm* — Taft Stettinius & Hollister LLP

(57) ABSTRACT

A portable apparatus for controlling a robot and a method therefor. The portable apparatus includes: an orientation sensor adapted for measuring orientation of the portable apparatus; an HMI device adapted for detecting two-dimensional manual motion relative to the HMI device; and a processing unit adapted for receiving a first signal representing the measured orientation of the portable apparatus and a second signal representing the detected two-dimensional manual motion relative to the HMI device and controlling a part of the robot to move in a direction in consideration of the measured orientation of the portable apparatus and the detected two-dimensional manual motion relative to the HMI device. By having the portable apparatus and the method therefor as explained herein, the two-dimensional manual movement on touch panel is integrated with orientation of the portable apparatus and an integration of these is mapped by the robot, which makes it possible to (Continued)

define a path in three dimensional space for jogging/teaching robot's movements in three dimension.

19 Claims, 2 Drawing Sheets

(51) Int. Cl.
  *B25J 13/08* (2006.01)
  *G06F 3/0346* (2013.01)
  *G06F 3/0488* (2013.01)
(52) U.S. Cl.
  CPC ........ *G06F 3/0346* (2013.01); *G06F 3/04883* (2013.01); *G05B 2219/39445* (2013.01); *G05B 2219/39449* (2013.01)
(58) Field of Classification Search
  USPC .............................................. 700/245, 251
  See application file for complete search history.

(56) References Cited

U.S. PATENT DOCUMENTS

| | | | |
|---|---|---|---|
| 6,088,628 A * | 7/2000 | Watanabe | B25J 9/1656 700/251 |
| 6,167,464 A * | 12/2000 | Kretschmann | G05B 19/042 340/539.1 |
| 6,205,839 B1 | 3/2001 | Brogårdh | B25J 9/1692 318/568.16 |
| 6,388,655 B1 * | 5/2002 | Leung | G01L 1/20 341/34 |
| 8,310,367 B1 * | 11/2012 | Vishwanath | G06K 19/0773 340/572.1 |
| 8,498,572 B1 | 7/2013 | Schooley et al. | |
| 8,896,534 B2 * | 11/2014 | Takeda | A63F 13/06 345/158 |
| 9,221,170 B2 * | 12/2015 | Barajas | B25J 9/1664 |
| 9,387,589 B2 * | 7/2016 | Barajas | B25J 9/1697 |
| 9,782,895 B2 * | 10/2017 | Kanada | B25J 9/161 |
| 2002/0153855 A1 | 10/2002 | Song et al. | |
| 2007/0171194 A1* | 7/2007 | Conti | G06F 3/011 345/156 |
| 2008/0027591 A1 | 1/2008 | Lenser et al. | |
| 2009/0204261 A1* | 8/2009 | Strand | B25J 9/1656 700/264 |
| 2010/0241273 A1 | 9/2010 | Ko | |
| 2012/0221177 A1 | 8/2012 | Shin et al. | |
| 2013/0063350 A1* | 3/2013 | Takeda | A63F 13/211 345/158 |
| 2013/0123983 A1* | 5/2013 | Brogrdh | B25J 9/162 700/254 |
| 2014/0014637 A1* | 1/2014 | Hunt | B25J 9/1689 219/124.22 |
| 2014/0371906 A1* | 12/2014 | Barajas | B25J 9/1664 700/257 |
| 2014/0371954 A1 | 12/2014 | Lee et al. | |
| 2015/0239127 A1* | 8/2015 | Barajas | B25J 9/1697 700/253 |
| 2015/0321351 A1* | 11/2015 | Kapoor | G05B 19/427 700/264 |
| 2016/0207198 A1* | 7/2016 | Willfor | G05B 19/4061 |

FOREIGN PATENT DOCUMENTS

| | | |
|---|---|---|
| CN | 101020312 A | 8/2007 |
| CN | 1381339 A | 11/2007 |
| CN | 102350700 A | 2/2012 |
| CN | 103279206 A | 9/2013 |
| EP | 2055446 A1 | 5/2009 |
| EP | 2192560 A1 | 6/2010 |
| EP | 2490395 A1 | 8/2012 |
| WO | 2013/094821 A1 | 6/2013 |

OTHER PUBLICATIONS

Pyo et al., "Design of 6-DOF Manipulator Intuitive Teaching System by Using Smart Phone Orientation," 2013 4th International Conference on Intelligent Systems, Modelling and Simulation, IEEE, pp. 364-369.

Abbas et al, Augmented Reality Based Teaching Pendant for Industrial Robot, 2012 12th International Conference on Control, Automation and Systems, Oct. 17-21, 2012, Jeju Island, Korea, pp. 2210-2213.

Extended European Search Report dated Feb. 28, 2018 in corresponding European application No. 14887969.5, 15 pages.

Muszynski et al., Adjustable Autonomy for Mobile Teleoperation of Personal Service Robots, The 21st IEEE International Symposium on Robot and Human Interactive Communication, Sep. 9-13, 2012, Paris, France, pp. 933-940.

Evans, III et al., Control Solutions for Robots Using Android and iOS Devices, Unmanned Systems Technology XIV, SPIE, vol. 8387, No. 1, May 11, 2012, pp. 1-10.

Bolla et al., A Fast Image Processing Based Robot Identification Method for Surveyor SRV-1 Robots, 2011 IEEE/ASME International Conference on Advanced Intelligent Mechatronics (AIM2011), Budapest, Hungary, Jul. 3-7, 2011, pp. 1003-1009.

Yagoda et al., Using Mobile Devices for Robotic Controllers: Examples and Some Initial Concepts for Experimentation, Army Research Laboratory ARL-TN-436, Jun. 2011, 38 pages.

Jan et al., Smartphone Based Control Architecture of Teaching Pendant for Industrial Manipulators, 2013 4th Conference on Intelligent Systems, Modelling and Simulation, Jan. 29-31, 2013, pp. 370-375.

Nasereddin et al., Smartphone Control Robots Through Bluetooth, IJRRAS 4(4), Sep. 2010, pp. 399-404.

Chinese Office Action, Chinese Patent Application No. 2018070901835830, dated Jul. 7, 2018, 15 pages including machine translation in English.

Chinese Search Report, Chinese Patent Application No. 2018070901835830, dated Jul. 7, 2018, 4 pages including machine translation in English.

* cited by examiner

PORTABLE APPARATUS FOR CONTROLLING ROBOT AND METHOD THEREOF

TECHNICAL FIELD

The invention relates to the field of apparatus and method for robot control, and more particularly to portable apparatus for robot control and method thereof.

BACKGROUND ART

Typically a robot is equipped with a teach panel. The device is relatively large (with a touch screen, operator buttons, etc.) and connected with robot controller by cable.

European Patent EP 2 055 446 published on 6 May, 2009 discloses a portable robot control apparatus to control a movement of a robot or of a robot tool end. The portable robot control apparatus comprises an inertial device with at least one acceleration sensor and/or at least one rotation sensor, where said inertial device measures its relative movement and the apparatus sends out to a robot controller a signal representing the relative movement, so that the robot controller is enabled to control the robot in such a way that said relative movement is repeated by the robot or by the robot tool end in real-time.

"Design of 6-DOF Manipulator Intuitive Teaching System by Using Smart Phone Orientation—User Friendly and Intuitive Teaching Operation for 6-DOF Manipulator", Sanghun Pyo, Syed Hassan, Yasir Jan and Jungwon Yoon, 4th International Conference on Intelligent Systems, Modelling and Simulation, 2013, describes a smart phone that can make user intention for industrial robot moving, and the information of orientation sensor is convert to robot's translation and orientation by assuming that smartphone orientation can be a conventional joy stick equipped a universal joint in base part. The method can move the robot's end effector by-directional as XY plane.

According to these conventional solutions, the orientation of the teach pedant/smart phone is mapped to the orientation of robot tool center point, however, realization of linear robot movement by teach pedant/smart phone is less intuitive Furthermore, the user normally changes the teaching settings by setting various parameters on the teach pedant/smart phone, which diverts the operator's attention from the robot that he is teaching and makes the teaching less convenient.

BRIEF SUMMARY OF THE INVENTION

The problems in the state of the art are at least partially overcome by the present subject-matter.

According to one aspect of the invention, a portable apparatus for controlling a robot includes: an orientation sensor, being adapted for measuring orientation of said portable apparatus; an HMI device, being adapted for detecting two-dimensional manual motion relative to said HMI device; and a processing unit, being adapted for receiving a first signal representing said measured orientation of said portable apparatus and a second signal representing said detected two-dimensional manual motion relative to said HMI device and controlling a part of said robot to move in a direction in consideration of said measured orientation of said portable apparatus and said detected two-dimensional manual motion relative to said HMI device.

According to another aspect of the invention, a method for manually controlling robot with a portable apparatus includes: measuring orientation of said portable apparatus; detecting two-dimensional manual motion relative to an HMI device of said portable apparatus; and controlling a part of said robot to move in a direction in consideration of said measured orientation of said portable apparatus and said detected two-dimensional manual motion relative to said HMI device of said robot.

By having the portable apparatus and the method therefor as explained herein, the two-dimensional manual movement on touch panel is integrated with orientation of the portable apparatus and an integration of these is mapped by the robot, which makes it possible to define a path in three dimensional space for jogging/teaching robot's movements in three dimension. This renders more intuitive than realization of linear robot movement by the portable orientation.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
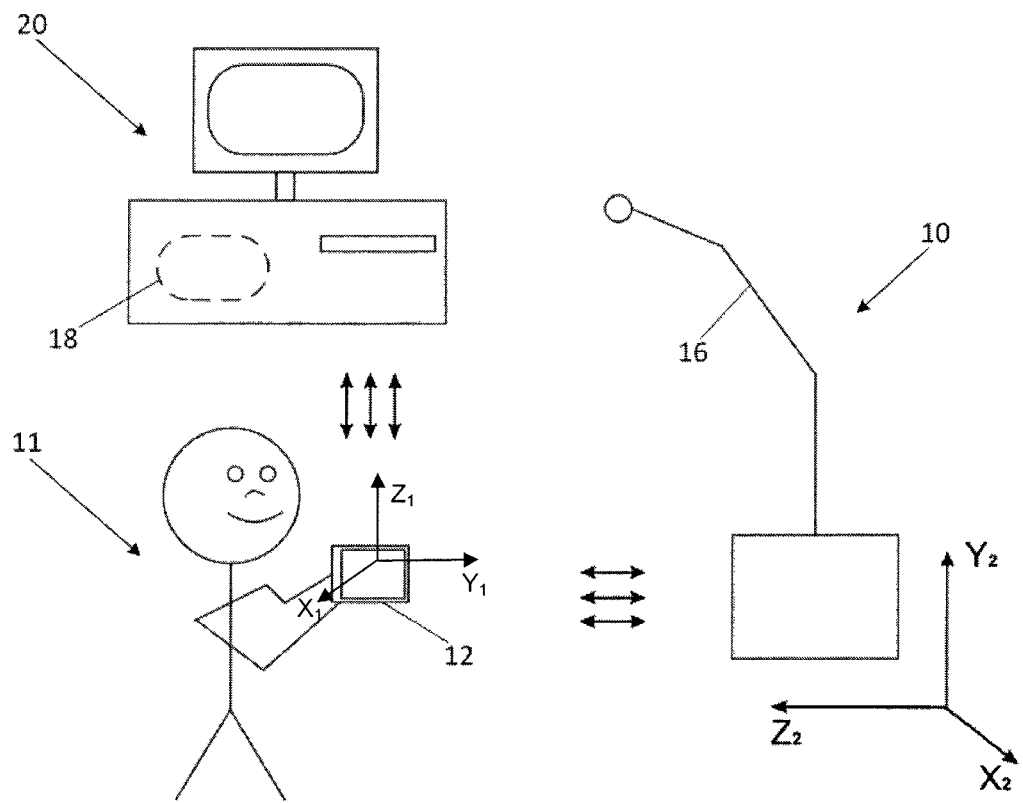
FIG. 1 shows an arrangement of a robot manipulated by an operator using a portable apparatus 12.

FIG. 1 shows an arrangement of a robot 10 manipulated by an operator 11 using a portable apparatus 12. A robot 10 comprises a manipulator 16 and a control system 18 for controlling the movements of the manipulator 16. The control system 18 is located in an external computer 20, in this case. The control system 18 can also be located in computational means in the portable apparatus 12 and/or in the manipulator 16. The manipulator 16 is adapted to be programmed to execute a plurality of tasks. During manual movement and programming of the robot 10, the robot operator 11 communicates with the control system 18 via the portable apparatus 12. The operator 11 inputs commands to the control system 18, for example, for starting and stopping a program, or for moving the manipulator 16 to a desired position. The control system 18 further comprises path planning means for calculating how the manipulator 16 should move so as to be able to execute the programmed tasks.

Figure 2:
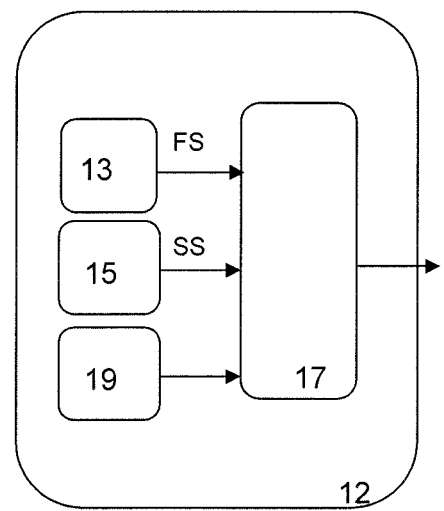
FIG. 2 illustrates a block diagram of the portable apparatus according to an embodiment of present invention.

FIG. 2 illustrates a block diagram of the portable apparatus according to an embodiment of present invention. The portable apparatus can be a smart phone, tablet, PDA and so on. The portable apparatus 12 is used for manual manipulating and programming the robot 10 by interacting with the control system 18. The portable apparatus 12 comprises an orientation sensor 13, an HMI device 15 (human machine interface), and a processing unit 17. The orientation sensor 13 is adapted to measure the orientation of the portable apparatus 12, for example it can be a three directional magnetometer or a combination of a three directional accelerometer and a three directional gyroscope. The HMI device 15 is adapted to detect two-dimensional manual motion relative to the HMI device 15; for example, the HMI device can comprise an input unit like a touch panel that tracks the movement of one or more fingers of the operator 11 in two degrees of freedom. The processing unit 17, for instance a processor or a logic programmable unit, is adapted for receiving a first signal FS representing the measured orientation of the portable apparatus 12 and a second signal SS representing the detected two-dimensional manual motion relative to said HMI device 15 and controlling a part of the robot 10 to move in a direction considering the measured orientation of the portable apparatus 12 and the detected two-dimensional manual motion relative to the HMI device 15. A part of the robot 10, for instance a tool mounted on the wrist of the robot 10 (conventionally referred as a TCP or tool center point) or a joint of the robot 10, can be controlled by moving one or two fingers upon the HMI device 15 of the portable apparatus 12, for example a touch panel. Jogging on the touch panel with finger movement is limited to two dimensions, which is detected by the HMI device 15. This HMI device 15 also sends the detected two-dimensional movement to the processing unit 17 of the portable apparatus 12; besides, additional three dimensions are introduced by changing orientation (i.e. gesture) of the portable apparatus 12 which is measured by the orientation sensor 13 of the portable apparatus 12 and the measurement is also sent to the processing unit 17 of the portable apparatus 12. The processing unit 17 thus considers the two-dimensional finger movement upon touch panel and the measurement of the three-dimensional orientation of the portable apparatus 12 and transforms them into a three-dimensional path in real world. For example, if the portable apparatus 12 will be held vertically and the operator 11 will move the finger up on the touch panel 15, the robot 10 will move the TCP or joint up, and vice versa. If the operator 12 wants to make a movement forward, he should orientate the portable apparatus 12 horizontally and move finger forward on touch screen 15, and vice versa. By having the portable apparatus for controlling robot, the two-dimensional manual movement on touch panel is integrated with orientation of the portable apparatus 12 and an integration of these is mapped by the robot, which makes it possible to define a path in three dimensional space for jogging/teaching robot's movements in three dimension. This renders more intuitive than realization of linear robot movement by the portable orientation.

Preferably, the processing unit 17 of the portable apparatus 12 is further adapted for controlling the part of robot 10 (for instance the TCP of robot joint) to move in a direction corresponding to a combination of the measured orientation of the portable apparatus 12 and a direction of the detected two-dimensional manual motion relative to the HMI device 15 and in a speed corresponding to a speed of the detected two-dimensional manual motion relative to the HMI device 15.

For instance, the orientation sensor 13 of the portable apparatus 12 is further adapted for measuring the orientation of a first three-dimensional coordinate system $(X_1, Y_1, Z_1)$ in one, two or three degrees of freedom, which is defined relative to the portable apparatus 12 and which follows movement of the portable apparatus 12. The robot 10 is operable in a second three-dimensional coordinate system $(X_2, Y_2, Z_2)$ fixed to the robot 10. The HMI device 15 is further adapted for detecting the two-dimensional manual motion relative to the HMI device 15 in the first three-dimensional coordinate system $(X_1, Y_1, Z_1)$, for instance, a touch panel arranged to detect operator finger's input in two degrees of freedom; the processing unit 17 is further adapted for determining a relative orientation between the first three-dimensional coordinate system $(X_1, Y_1, Z_1)$ and the second three-dimensional coordinate system $(X_2, Y_2, Z_2)$ based on orientation measurements from the orientation sensor 13 and the fixed orientation of the second three-dimensional coordinate system, calculating a transformation between the first three-dimensional coordinate system $(X_1, Y_1, Z_1)$ and the second three-dimensional coordinate system $(X_2, Y_2, Z_2)$ based on the relative orientation between these coordinate systems, and transforming the detected two-dimensional manual motion relative to the HMI device 15 into corresponding movements of the part of manipulator in the second three-dimensional coordinate system $(X_2, Y_2, Z_2)$ based on the calculated transformation. The workspace of the manipulator 16 of the robot 10 is defined in order to move the manipulator 16 among different positions in the workspace in a controlled manner when manually moving the robot 10, for instance to move the TCP of the tool hold by the robot or the joint of the manipulator 16 (the part of the robot). These positions in the workspace of the robot 10 are defined by using a coordinate system, for instance, a Cartesian coordinate system, having an origin and the directions of the axes defined in relation to the robot 10 or the portable apparatus 12 or the HMI device 15 of the portable apparatus 12. Manipulators are usually adapted to be maneuvered in up to six degrees of freedom (DOF), which in this case means three translational degrees of freedom represented by the X,Y,Z-axis and three rotational degrees of freedom represented by rotations round the X,Y,Z-axis. In this case the first three-dimensional coordinate system $(X_1, Y_1, Z_1)$ is defined relative to the portable apparatus 12 such that it follows the movements of the portable apparatus 12 (such as smart phone or tablet), the second three-dimensional coordinate system $(X_2, Y_2, Z_2)$ is defined fixed to the manipulator 16 of the robot 10. The movements of different parts of the manipulator are then defined in the second coordinate system $(X_2, Y_2, Z_2)$, and the manual motion relative to the HMI device is defined in in the first three-dimensional coordinate system $(X_1, Y_1, Z_1)$.

During a manual movement task the operator 11 can move the manipulator 16 around in different directions and thereby the operator usually holds the portable apparatus in various gestures and moves his finger on the touch panel of the portable apparatus. The operator 11 thereby causes a reorientation of the first three-dimensional coordinate system $(X_1, Y_1, Z_1)$ relative the second three-dimensional coordinate system $(X_2, Y_2, Z_2)$, because the first coordinate system $(X_1, Y_1, Z_1)$ is defined relative to the portable apparatus 12.

To determine this reorientation the portable apparatus 12, the processing unit 17 is adapted to determine the relative orientation between the first three-dimensional coordinate system $(X_1, Y_1, Z_1)$ and the second three-dimensional coordinate system $(X_2, Y_2, Z_2)$, that is how the first three-dimensional coordinate system $(X_1, Y_1, Z_1)$ has been rotated relative to the second three-dimensional coordinate system $(X_2, Y_2, Z_2)$. The processing unit 17 of the portable apparatus 12 is further adapted to repeatedly update the first three-dimensional coordinate system such that each axis of the first three-dimensional coordinate system corresponds to a matching axis $X_2, Y_2, Z_2$ in the second coordinate system $(X_2, Y_2, Z_2)$. This is done by calculating the transformation from the first coordinate system $(X_1, Y_1, Z_1)$ to the second coordinate system $(X_2, Y_2, Z_2)$ and applying this transformation to every movement of the portable apparatus measured in the first coordinate system $(X_1, Y_1, Z_1)$. The transformation includes information on the rotation but not the translation between the coordinate systems. As regards the speed for the robot movement, for example, the operator 11's finger is moving with respect to the touch panel at a speed of 0.1 m/s, and the robot is controlled to move at 0.1 m/s multiplied by a predetermined scaling ratio.

As shown in FIG. 2, the portable apparatus 12 further includes an identification marker reader 19 which is adapted for receiving signal representing information about the part of the robot 10 from an external identification marker. The identification marker can be a RFID (radio frequency identification) tag, an NFC (near field communication) tag or QR code (quick response code) tag. The processing unit 17 is further adapted for selecting the part of the robot among a multiple of parts of the robot 10 based on the information from the identification marker, for example, to select the part of the robot for jogging/teaching. Preferably, the identification marker which records the information about the part of the robot is attached with said part of the robot. For example, as shown in FIG. 1, the identification marker for the first joint is attached on the first joint. This allows the operator to set the jogging/teaching target more intuitively. In particular, the operator 11 touches NFC tag on the first joint of robot with the portable apparatus 12. By that, the operator can manually control the first joint of the manipulator 16 of the robot 10 by using the portable apparatus 12. As described above, the first joint is following the portable apparatus 12's orientation change. When the operator 11 touches the second joint with the portable apparatus 12, the part of the robot that could be moved changes from the first joint to the second joint, then the second joint follows the portable apparatus 12's orientation change. As alternative, it is possible to select different joints and jogging modes based on the information recoded by the identification marker: group of joints, linear movement, or reorientation. While the portable apparatus can be rotated in three dimension (pitch, yaw, roll), only the rotation along one of the directions is used to map to a robot axis, and the rotation on other directions is ignored. While using identification techniques, teach settings can be change without using of any display. The operator does not need to keep an eye on the robot all the time. He does not need to select anything from menu, but just moves the portable device to certain area with respect to the robot which is quicker and not taking much of the operator's attention.

Preferably, the identification marker reader 19 is adapted for receiving signal representing information about a multiple of robots from an external identification marker tags, and the processing unit 17 is further adapted for selecting one of the robots as master and the others as slave.

Preferably, the processing unit 17 is further adapted for receiving a third signal representing the speed of the movement of the part of the robot 10 from control system 18 of the robot 10 and judging if a scaling factor between the speed of the detected two-dimensional manual motion relative to said HMI device 15 and that of the movement of the part of the robot 10 falls in an allowable range. The processing unit 17 is further adapted for receiving a fourth signal from the control system 18 of the robot 10 and judging if the position is in collision with an external object, if there is an internal component mal-function, robot is closer to be or already out of range. The HMI device is further adapted for sending sound, vibrating or changing its background color for indicating various conditions of said robot 10 as above.

Preferably, the HMI device 15 is further adapted for displaying robot information based on robot signal received from the control system 18 of the robot 10, such as actual position, actual speed, actual acceleration, actual torque, I/O, internal data of robot status (for example current of motor), etc. By having the displaying function, the operator can judge if there is an internal component mal-function. This implies that the processing unit 17 is further adapted for receiving more than one signal representing different robot information.

Figure 3:
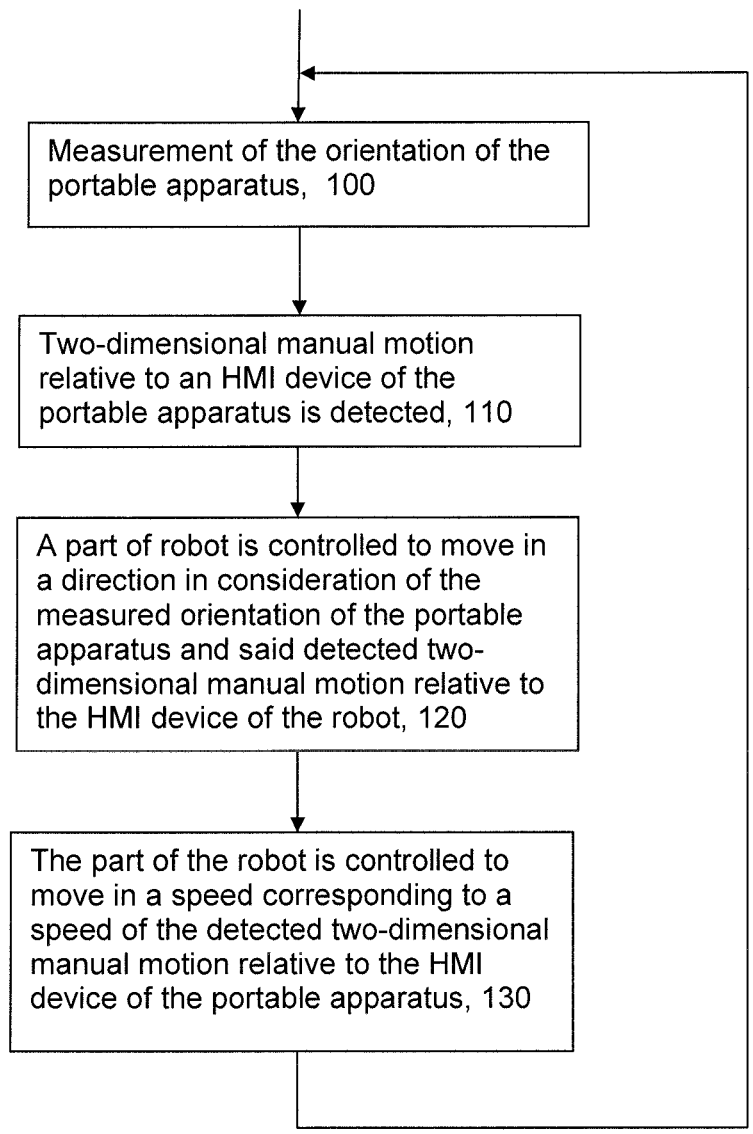
FIG. 3 shows a simplified flowchart for carrying out a method for manually control a robot according to an embodiment of the invention.

FIG. 3 shows a simplified flowchart for carrying out a method for manually control a robot according to an embodiment of the invention. The method then repeatedly performs the steps described in following paragraph.

A measurement of the orientation of the portable apparatus, block 100. In practice a home position with a known orientation relative the second three-dimensional coordinate system is defined. After a homing is performed, orientation sensor measures the reorientation in relation to the home position. The measurement of the orientation of the portable apparatus can be done by measuring orientation of a first three-dimensional coordinate system which is defined relative to said portable apparatus and which follows movement of said portable apparatus. Two-dimensional manual motion relative to an HMI device of the portable apparatus is detected, block 110. For example, the two-dimensional manual motion relative to the HMI device of the portable apparatus is detected in the first three-dimensional coordinate system. A part of said robot is controlled to move in a direction in consideration of the measured orientation of said portable apparatus and said detected two-dimensional manual motion relative to said HMI device of said robot, block 120. The part of said robot is controlled to move in a speed corresponding to a speed of said detected two-dimensional manual motion relative to said HMI device of said portable apparatus, block 130.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A portable apparatus for controlling a robot, including:
    an orientation sensor structured to measure orientation of said portable apparatus;
    a human machine interface (HMI) device structured to detect two-dimensional manual motion relative to said HMI device; and
    a processing unit structured to receive a first signal representing said measured orientation of said portable apparatus and a second signal representing said detected two-dimensional manual motion relative to said HMI device and controlling a part of said robot to move in a direction corresponding to a combination of said measured orientation of said portable apparatus and a direction of said detected two-dimensional manual motion relative to said HMI device.

2. The portable apparatus according to claim 1, wherein:
    said processing unit is further structured to control said part of said robot to move in a speed corresponding to a speed of said detected two-dimensional manual motion relative to said HMI device.

3. The portable apparatus according to claim 2, wherein:
    said orientation sensor is further structured to measure orientation of a first three-dimensional coordinate system which is defined relative to said portable apparatus and which follows movement of said portable apparatus;

said robot is operable in a fixed second three-dimensional coordinate system;

said HMI device is further structured to detect said two-dimensional manual motion relative to said HMI device in said first three-dimensional coordinate system;

said processing unit is further structured to determine a relative orientation between the first and second three-dimensional coordinate systems, calculating a transformation between the first and second three-dimensional coordinate systems based on said relative orientation between these coordinate systems and transforming said detected two-dimensional manual motion relative to said HMI device into corresponding movements of said part of said robot in the second three-dimensional coordinate system based on said calculated transformation.

4. The portable apparatus according to claim 1, wherein said orientation sensor is a three directional magnetometer or a combination of a three directional accelerometer and a three directional gyroscope.

5. The portable apparatus according to claim 1, wherein said HMI device is a touch panel.

6. The portable apparatus according to claim 1, wherein said part of said robot is a tool attached to said tool.

7. The portable apparatus according to claim 1, wherein said part of said robot is a joint.

8. The portable apparatus according to claim 1, further including:

at least one identification marker reader, being structured to receive a signal representing information about said part of said robot from an external identification marker;

wherein:

said processing unit is further structured to select said part of said robot among a multiple of parts of said robot based on said information about said part of said robot.

9. The portable apparatus according to claim 8, wherein said identification marker is attached with said part of said robot.

10. The portable apparatus according to claim 8, wherein said processing unit is further structured to set a movement mode based on said information about said part of said robot.

11. The portable apparatus according to claim 1, further including:

an identification marker reader, being structured to receive signal representing information about a multiple of robots from an external identification marker tag;

wherein:

said processing unit is further structured to select one of said robots as master and the others as slave.

12. The portable apparatus according to claim 8, wherein said identification marker is at least one of a RFID tag, an NFC tag or an QR code tag.

13. The portable apparatus according to claim 1, wherein said processing unit is further structured to receive a third signal representing the speed of the movement of said part of said robot from controller of said robot and judging if a scaling factor between the speed of said detected two-dimensional manual motion relative to said HMI device and that of the movement of said part of said robot falls in an allowable range.

14. The portable apparatus according to claim 1, wherein said processing unit is further structured to receive a fourth signal representing position of said part of said robot from controller of said robot and judging if said position is in collision with an external object.

15. The portable apparatus according to claim 1, wherein said HMI device is further structured to display robot information based on robot signal received from controller of said robot.

16. The portable apparatus according to claim 15, wherein said robot information represents mal-function of a part of said robot.

17. The portable apparatus according to claim 1, wherein said HMI device is further structured to send sound, vibrate or change its background color for indicating various conditions of said robot.

18. A method for manually controlling robot with a portable apparatus, including:

measuring orientation of said portable apparatus;

detecting two-dimensional manual motion relative to a human machine interface (HMI) device of said portable apparatus; and controlling a part of said robot to move in a direction in consideration of a combination of said measured orientation of said portable apparatus and a direction of said detected two-dimensional manual motion relative to said HMI device of said robot.

19. The method for manually controlling robot according to claim 18, further including:

controlling said part of said robot to move in a speed corresponding to a speed of said detected two-dimensional manual motion relative to said HMI device of said portable apparatus.

* * * * *